W. T. Wells,
Gate Latch.
Nº 63,769. Patented Apr. 9, 1867.
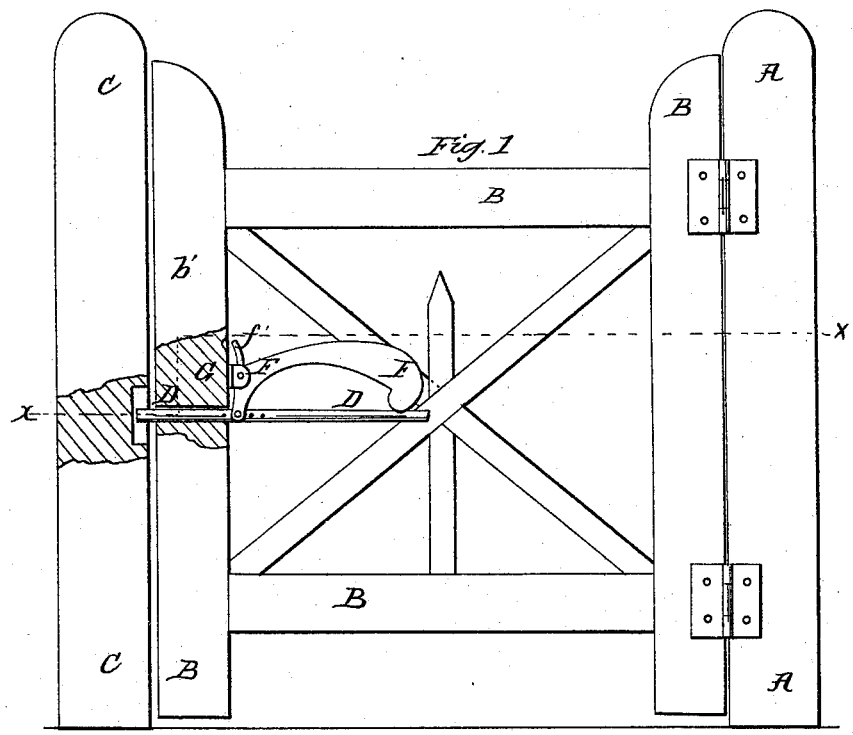
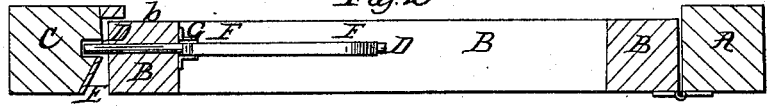
Witnesses:
Inventor:

United States Patent Office.

W. T. WELLS, OF DECATUR, ILLINOIS.

*Letters Patent No. 63,769, dated April 9, 1867.*

IMPROVED GATE-LATCH.

*The Schedule referred to in these Letters Patent and making part of the same.*

TO ALL WHOM IT MAY CONCERN:

Be it known that I, W. T. WELLS, of Decatur, in the county of Macon, and State of Illinois, have invented a new and useful improvement in Gate-Latch; and I do hereby declare that the following is a full, clear, and exact description thereof, which will enable others skilled in the art to make and use the same, reference being had to the accompanying drawings, forming part of this specification, in which—

Figure 1 is a side view of a gate with my improved latch attached, part being broken away to show the construction.

Figure 2 is a detail sectional view of the same, taken through the line $x\ x$, fig. 1

Similar letters of reference indicate like parts.

My invention has for its object to furnish an improved adjustable gate-latch constructed without springs, and so arranged that the bolt will be thrown quickly into the catch, that it cannot be opened by cows or other cattle; that it may be readily adjusted to accommodate the position of a shrunken or sagged gate or post; that it will not be liable to get out of order, and that it will be easily attached to the gate. And it consists of an improved gate-latch formed by the combination of the adjustable bolt and lever-handle with each other and with the frame of the gate, as hereinafter more fully described.

A is the post to which the gate B is hinged in the ordinary manner. C is the front post, to which the gate is latched. D is the bolt of the latch, which passes horizontally through the front upright $b'$ of the gate B, and its forward end catches upon and is held by the catch E attached to the post C, as shown in fig. 2. The front side of the catch E is made inclined, so that the gate may be self-latching. F is the lever-handle of the latch, which is made substantially in the form shown in fig. 1, and is pivoted at the upper part of its forward end to the front upright $b'$, by ears, G, attached to said upright, or in any other convenient manner. To the lower or downwardly-projecting part of the forward end of the lever-handle F is pivoted the bolt D by a pin, or equivalent, passing through ears formed upon the said lever-handle, and through a hole formed in the bolt D, as shown in fig. 1. Several holes are formed through the bolt D for this purpose, so that the said bolt may be adjusted to the relative position of the gate B and post C, should said gate or post be thrown out of the proper position by sagging or from any other cause. $f'$ is a stop formed upon or attached to the upper edge of the forward end of the lever-handle F, to prevent the free end of said handle from being raised too high, or the bolt D drawn out too far. It will be observed that the bolt D and handle F are so constructed that the entire weight of the lever-handle F operates to force the bolt D forward, making it prompt to act upon the catch E, and holding it securely in place. It will also be observed the lever handle F extends out directly above the extended rear end of the bolt D, so that it will be impossible for cattle to operate the said lever-handle to open the gate.

I claim as new, and desire to secure by Letters Patent—

An improved gate-latch formed by the combination of the adjustable bolt D and pivoted lever-handle F with each other and with the frame of the gate B, substantially as herein shown and described.

W. T. WELLS.

Witnesses:
J. W. COLEMAN,
W. W. ENGLISH.